United States Patent [19]

Benedetto et al.

[11] Patent Number: 5,531,414
[45] Date of Patent: Jul. 2, 1996

[54] DEVICE FOR MOUNTING TERMINAL STRIPS IN COMMUNICATIONS TECHNOLOGY

[75] Inventors: Adrian Benedetto; Winfried Schachtebeck, both of Berlin, Germany

[73] Assignee: Krone Aktiengesellschaft, Berlin-Zehlendorf, Germany

[21] Appl. No.: 179,360

[22] Filed: Jan. 10, 1994

[30] Foreign Application Priority Data

Jan. 9, 1993 [DE] Germany .................. 9300339 U

[51] Int. Cl.⁶ .................................. H01R 9/26
[52] U.S. Cl. .................... 248/201; 248/231.81; 439/532; 439/716
[58] Field of Search .................. 248/231.8, 300, 248/316.7, 201; 24/546; 439/532, 716

[56] References Cited

U.S. PATENT DOCUMENTS

| | | | |
|---|---|---|---|
| 1,895,656 | 1/1933 | Gadke | 248/231.8 X |
| 2,456,553 | 12/1948 | Churchill | 248/231.8 X |
| 3,116,742 | 1/1964 | Seckerson | 248/231.8 X |
| 3,143,214 | 8/1964 | Moore et al. | 439/532 X |
| 4,947,290 | 8/1990 | Ootsuka | 439/716 X |
| 4,961,555 | 10/1990 | Egan, Jr. | 248/231.8 |
| 5,074,508 | 12/1991 | Powers | 248/231.8 X |

FOREIGN PATENT DOCUMENTS

| | | | |
|---|---|---|---|
| 2510821 | 2/1983 | France | 439/716 |
| 1590344 | 6/1970 | Germany | 439/716 |

*Primary Examiner*—Ramon O. Ramirez
*Assistant Examiner*—Derek J. Berger
*Attorney, Agent, or Firm*—McGlew and Tuttle

[57] ABSTRACT

The invention relates to a device for mounting terminal strips (7), used in communications technology, on to an installation profile using a snap-on member for fastening. In order to provide a device for ensuring proper mounting of terminal strips (7), used in communication technology, to installation profiles with different cross-sectional profiles, a mounting bracket (1) is provided whose bent shanks (10) are embodied as clip-snap members (2) and whose other shanks (6) are formed with a cut-out (9) which as such is known.

11 Claims, 2 Drawing Sheets

DEVICE FOR MOUNTING TERMINAL STRIPS IN COMMUNICATIONS TECHNOLOGY

FIELD OF THE INVENTION

The invention relates to a device for mounting terminal strips used in communications technology, and in particular to a device for mounting terminal strips with nip-clinch members for round profile rods onto installation profiles which do not have round-profiled rods, but instead have fish-plates extending laterally.

BACKGROUND OF THE INVENTION

A similar device of the aforementioned species is known from DE 37 28 368 C1. The known device has two snap-on members embodied as arch-shaped attachments, which are arranged on the terminal strip and which embrace the profiled rail when the terminal strip is attached to the profiled rail. In the preferred embodiment, the profiled rails are round-profiled rods. Because of the arched shape of the snap-on members, the application of the device is limited to certain constructional designs of the profiled rails. Thus, for example, it is not readily possible to mount terminal strips on installation rails which have rectangular cross sections with fish-plate ends or similar construction.

A further device of the aforementioned species is known from DE 28 11 812 C2. The cable ending facility suggested here, inter alia for mounting terminal strips, consists essentially of earth connection strips which have a common floor wall that joins them to form a U-shaped sheet-metal tub which is connected on its front side to a frame. The fish-plates of the earth connection strips have a cut-out which engages with a snap-on device of the strips. This device also is not suitable for mounting terminal strips on installation rails with rectangular cross sections.

SUMMARY AND OBJECTS OF THE INVENTION

The invention is thus based on the objective of developing a device of the aforementioned species that ensures that terminal stirps used in communication technology can be mounted on profiled installation rails that have a variety of cross-sections.

In one embodiment of the present invention, a device has first and second shanks which are angularly connected preferably through a 90° angle. The first shank is receivable into a take-up opening in the terminal strip. A connection means connects the terminal strip to the first shank and includes a connection cut-out defined by a contacting fish-plate of the first shank. The second shank has a clip-snap means for connecting to a fish-plate end of the installation profile. The clip-snap means includes opposite lateral parts of the second shank and a middle part of the second shank which is separated and spaced from the lateral parts by a notch or grooved cut-out. The middle part is a spring which is biased against the fish-plate when the clip-snap means is connected to the fish-plate. A portion of the middle part forms a stop means for blocking movement of the fish-plate towards the first shank. A first end portion of the middle part is adjacent to the first shank and is spaced away from the lateral parts in a first shank direction on one side of the lateral parts. A second end portion of the middle part is spaced from the lateral parts in the first shank direction on another side of the lateral parts. The portion of the middle part which form the stop means extends from the first end portion to the second end portion of the middle part.

Another embodiment of the present invention, is a U-shaped bracket with two arm shanks and a base joining the arm shanks. Lateral parts extend substantially perpendicular from each of the arm shanks into a center of the U-shaped bracket. Each of the lateral parts has a snap-on means for connecting to the fish-plate ends of the installation profile. A wall part extends substantially perpendicular from the base into the center of the U-shaped bracket. A clamping means clamps both arm shanks together and clamps the snap-on means onto the fish-plate ends. Another U-shaped bracket is spaced from the first U-shape bracket and is similar to the first U-shaped bracket. A first round profile rod is connected on one end to the U-shaped bracket end on another end to the another U-shaped bracket. A second round profile rod is similarly connected to both U-shaped brackets. The terminal strip includes nip-clinch means for mounting onto one of said first and second round profile rods.

The application of the mounting bracket with its clamping snap-on members facilitates mounting terminal strips with nip-clinch contacts on to both profiled rails used in nip-clinch technology (LSA profile technology) as well as on to other existing profiled installation rails. The dimensions of the mounting bracket are chosen so as to ensure that it can be used in many known systems, e.g. Standard Pouyet, Mars-Actel, Infa+. The electrical interface between the various profiled rails (profiled installation rails) and the terminal strips for building up continuous shielding is provided through the design of one of the shanks of the mounting bracket which serves as a contacting fish-plate to the outgoing and incoming conductor sides of the terminal strip.

The embodiment of the device in the form of an assembly bracket facilitates using two assembly brackets to build up an adapter-set which, when snap-mounted on to the installation profile, provides a facility for fastening terminal strips with nip-clinch contacts. While the mounting bracket is only used as an adapter clip for mounting individual-terminal strips with nip-clinch contacts on to an installation profile having fish-plates on its sides, when the assembly bracket is used, a larger number of terminal strips can be mounted.

Further advantageous embodiments of the invention are achieved through the sub-claims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
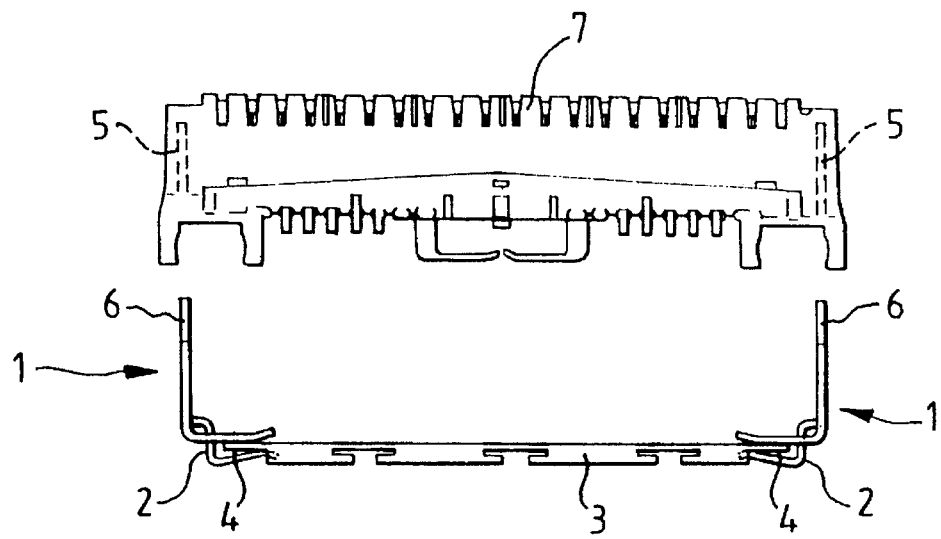
FIG. 1 is a schematic representation of the mounting brackets, snap mounted on to an installation profile, for mounting a terminal strip using nip-clinch technology.

FIG. 1 shows two mounting brackets 1, that are snap mounted with their clip-snap members or means 2 to an installation profile 3 having lateral fish-plates 4. The first shank 6 of the mounting bracket 1 has connecting means for being clicked or inserted into the take-up opening 5 of the terminal strip 7 to be fastened.

Figure 2:
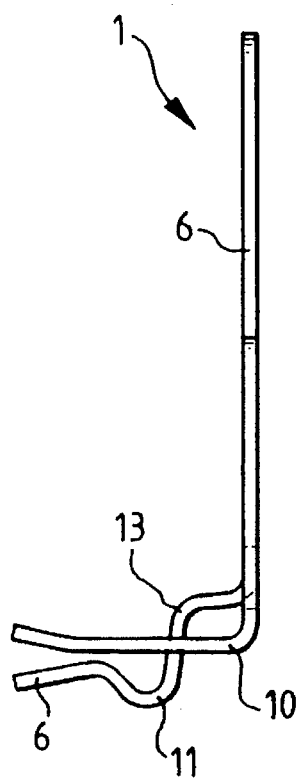
FIG. 2 is a side view of the mounting bracket according to FIG. 1.
Figure 3:
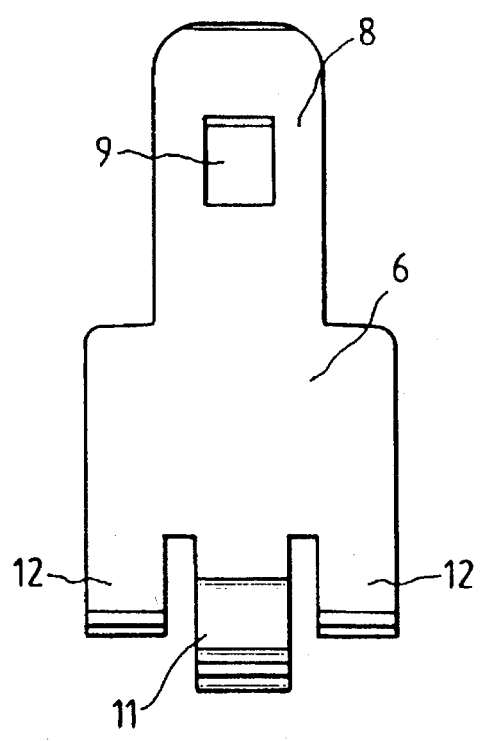
FIG. 3 is a view of the mounting bracket according to FIG. 2.

FIGS. 2 and 3 show the constructional embodiment of the mounting bracket 1. The upper half of the long shank 6 of the mounting bracket 1 is formed into a contacting fish-plate 8 and has a connection cut-out 9 (FIG. 3) which corresponds to a not shown click-stop device in the terminal plate 7, and thus ensures a firm connection. The second shorter shank 10 of the mounting bracket 1 is formed to a middle part 11 that has been largely cut free from the main part by clip-snap cut-outs and is embodied as an S-shaped spring member or means for biasing against the fish-plate. The end region of each of the two lateral parts or sides 12 is bent upwards slightly. Together with an end of the middle part 11 that is bent downwards slightly, the two side parts 12 form the clip-snap member 2 into which the fish-plates 4 of the installation profile 3 engage. The middle part 11 is embodied in such a way (FIG. 2) that a web or stopping means 13 of length L is formed behind the 90° bend; this web forms a stop for movement of the fish-plate 4 of the installation profile 3 toward the first shank 6 and thus fixes the entire width of the assembly. The assembly consists of two mounting brackets 1 and the installation profile 3. In one embodiment of the mounting bracket 1, the bent shank 10 may also be formed as a one-piece clipping member so that it can be fitted into a guide rail of an installation profile.

The mounting bracket 1 is used for mounting individual terminal strips with nip-clinch members or means on to installation profiles, where the embodiment of such terminal strips does not provide for direct mounting.

Figures 4, 5:
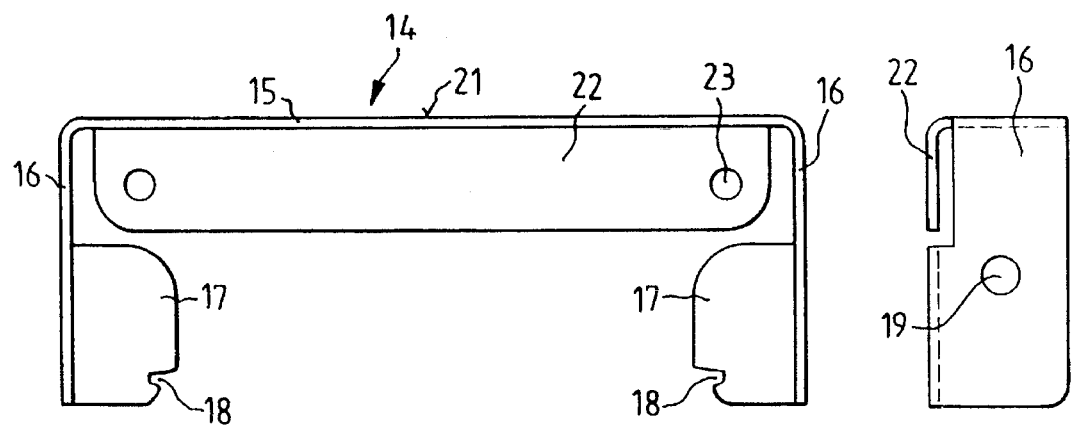
FIG. 4 is a view of an assembly bracket.
FIG. 5 is a side view of an assembly bracket according to FIG. 4.
Figure 6:
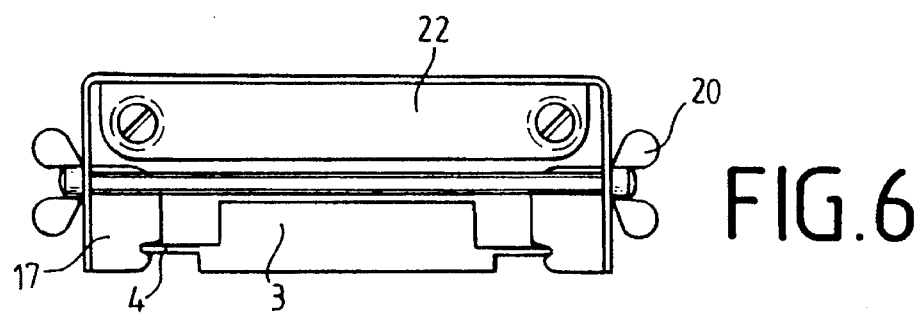
FIG. 6 is a view of an assembly bracket according to FIG. 4 in its snap-mounted condition.

FIGS. 4 and 5 show an embodiment of the device for mounting terminal strips, whereby the device is embodied as an assembly bracket 14. The assembly bracket 14 is formed from a U-shaped bracket 15. In the lower region of the bracket the two short arm shanks 16 of the bracket 15, each have a lateral part 17 that is bent inward at right angle. In the lower region of each lateral part 17 there is a snap-on member or means 18 for connecting to the fish-plates of the installation profile. This snap-on member 18 consists of a notch and is designed in such a way that it engages with the correspondingly formed fish-plates 4 of the installation profile 3. Furthermore, the two short arm shanks 16 have clamping boreholes 19 (FIG. 5) into which a clamping device 20 (FIG. 6), consisting of two wing nuts and a threaded rod, is inserted. This clamping device 20 services to provide a secure hold for the assembly bracket 14 on the respective installation profile.

Figure 7:
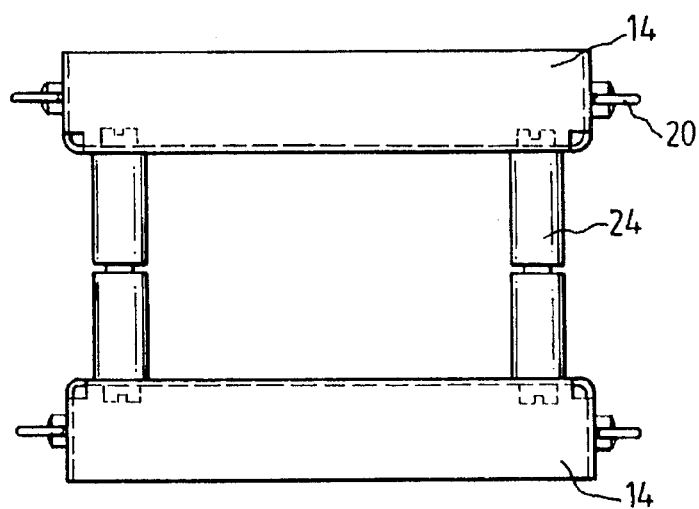
FIG. 7 is a view of an adapter set consisting of two assembly brackets: according to FIG. 4 mounted on two round-profiled rods.

The base side 21 of the U-shaped bracket 15 has a wall part 22 that is bent inward at a right angle and which has 2 rod boreholes 23 (FIG. 4). The distance between the boreholes 23 corresponds to the width of the installation profile and thus also to the distance between the snap-on members. The boreholes 23 serve to fasten the assembly bracket 14 onto two round-profiled rods 24. When one mounting bracket 14 each is mounted on the lower and the upper end of round-profiled rods 24, an assembly unit is created on to which, for example, 20 pcs. terminal strips with nip-clinch members can be mounted, and which in accordance with FIGS. 6 and 7 can then be clipped onto the installation profile 3 (FIG. 6) by means of the snap-on members 18 of the assembly bracket 14.

While specific embodiments of the invention have been shown and described in detail to illustrate the application of the principles of the invention, it will be understood that the invention may be embodied otherwise without departing from such principles.

What is claimed is:

1. A device for mounting a terminal strip onto an installation profile with fish plate ends, the device comprising:

a first shank having connection means designed for connecting to the terminal strip, said connection means including a connection cut-out defined by said first shank;

a second shank angularly extending from said first shank, said second shank having clip-snap means designed for connecting to a first plate end of the installation profile, said second shank extends substantially perpendicular to said first shank, said clip-snap means includes opposite lateral parts of said second shank and a middle part of said second shank, said middle part being separate and spaced from said lateral parts by said second shank defining clip-snap cut-outs, said connection means includes a plane of said first shank being perpendicular to a plane of said second shank and also perpendicular to a longitudinal axis of said lateral parts.

2. A device in accordance with claim 1, wherein:

said middle part is a spring means for biasing against the fish plate;

said lateral parts have end regions that are angled away from the fish plate.

3. A device in accordance with claim 1, wherein:

said connection means of said first shank includes a contacting fish plate which clip-fastens said first shank into the terminal strip.

4. A device in accordance with claim 3, wherein:

said contacting fish plate of said first shank is shaped to be insertable into a take-up opening of the terminal strip;

said connection cut-out being positioned in said contacting fish plate of said first shank.

5. A device in accordance with claim 1, wherein:

said longitudinal axis of said lateral parts are normal to said plane of said first shank.

6. A mounting device for communication technology, the device comprising:

an installation profile with fish plate ends positioned on substantially opposite sides of said installation profile;

a terminal strip spaced from said installation profile;

a bracket positioned between the terminal strip and the installation profile, said bracket including a first shank having connection means designed for connecting to the terminal strip, said connection means including a connection cut-out defined by said first shank, said bracket also including a second shank angularly extending from said first shank, said second shank having clip-snap means design for connecting to a fish plate end of the insulation profile, said second shank extends substantially perpendicular to said first shank;

first and second snap means positioned on a side of said bracket adjacent said installation profile and for connecting said bracket to said fish plate ends; and connection means positioned on another side of said bracket adjacent said terminal strip and for connecting said terminal strip to said bracket.

7. A device in accordance with claim 6, further comprising:

another bracket positioned between the terminal strip and the installation profile;

first and second snap means positioned on a side of said another bracket adjacent said installation profile and for connecting said another bracket to said fish plate ends; and connection means positioned on another side of said another bracket adjacent said terminal strip and for connecting said terminal strip to said another bracket.

8. A device in accordance with claim 6, wherein:

said clip-snap means includes opposite lateral parts of said second shank and a middle part of said second shank, said middle part being separate and spaced from said lateral parts by said second shank defining clip-snap cut-outs;

said connection means includes a plane of said first shank being perpendicular to a plane of said second shank and also perpendicular to a longitudinal axis of said lateral parts.

9. A device in accordance with claim 6, wherein:

said fish plate ends of said installation profile extend in substantially opposite directions.

10. A device for mounting a terminal strip onto an installation profile with fish plate ends, the device comprising:

a first shank having connection means designed for connecting to the terminal strip, said connection means including a connection cut-out defined by said first shank;

a second shank angularly extending from said first shank, said second shank having clip-snap means designed for connecting to a fish plate end of the installation profile, said second shank extends substantially perpendicular to said first shank, said clip-snap means includes opposite lateral parts of said second shank and a middle part of said second shank, said middle part being separate and spaced from said lateral parts by said second shank defining clip-snap cut-outs, said middle part is a spring means for biasing against the fish plate, said lateral parts have end regions that are angled away from the fish plate, a portion of said middle part forms a stop means for blocking movement of the fish plate toward said first shank, said portions of said middle part formed in an S-like shape extending outward from both sides of said plane of said second shank, and said stop means being spaced from said first shank, said connection means includes a plane of said first shank being perpendicular to a plane of said second shank and also perpendicular to a longitudinal axis of said lateral parts.

11. A device in accordance with claim 10, wherein:

said lateral parts of said second shank being spaced from said middle part in a first shank direction, said first shank direction being substantially perpendicular to a plane of said second shank, a first end portion of said middle part adjacent said first shank is spaced from said lateral parts in said first shank direction on one side of said lateral parts, a second end portion of said middle part is spaced from said lateral parts in said first shank direction on another side of said lateral parts, said stop means extending from said first end portion to said second end portion.

* * * * *